United States Patent [19]

Elkins

[11] Patent Number: 4,774,449

[45] Date of Patent: Sep. 27, 1988

[54] TRANSFORMERLESS BATTERY CHARGER IN COMBINATION WITH A BATTERY, AND METHOD OF CHARGING A BATTERY

[76] Inventor: Robin K. Elkins, 5931 Ravenswood Rd., Suite 20A, Fort Lauderdale, Fla. 33312

[21] Appl. No.: 835,159

[22] Filed: Mar. 3, 1986

[51] Int. Cl.[4] .................................................. H02J 7/00
[52] U.S. Cl. ...................................... 320/21; 320/33; 320/59; 320/DIG. 1
[58] Field of Search .................... 320/2, 15, 21, 57, 59, 320/DIG. 2, 33; 307/66

[56] References Cited

U.S. PATENT DOCUMENTS

| | | | |
|---|---|---|---|
| 3,176,212 | 3/1965 | De Puy | 320/DIG. 2 |
| 3,382,425 | 5/1968 | Legatti | 320/DIG. 2 UX |
| 3,471,771 | 10/1969 | Mortimer | 320/DIG. 2 UX |
| 3,876,921 | 4/1975 | Bigbee, III | 320/21 X |
| 3,936,718 | 3/1976 | Melling et al. | 320/21 X |
| 3,970,912 | 7/1976 | Hoffman | 320/2 |
| 3,987,354 | 10/1976 | Mason | 320/DIG. 2 UX |
| 4,321,523 | 3/1982 | Hammel | 320/59 X |
| 4,383,212 | 5/1983 | Ballman | 320/DIG. 2 X |
| 4,389,608 | 6/1983 | Dahl et al. | 320/33 |
| 4,410,835 | 10/1983 | Zabroski | 307/66 X |

Primary Examiner—Patrick R. Salce
Assistant Examiner—Anita M. Ault
Attorney, Agent, or Firm—Joseph Zallen

[57] ABSTRACT

A transformerless battery charger having a circuit for connecting the battery to an A.C. power source to supply charging current to the battery including: an inductive impedance in series with the battery for limiting the charging current through the battery. An electronic switch in the form of a TRIAC or SCR is connected in series with the battery, and the electronic switch is normally non-conductive thereby keeping open the charging circuit for the battery. An electronic trigger for turning on said electronic switch is provided to close the charging circuit for the battery as a function of the difference between the instantaneous voltage from said A.C. power source and the battery voltage. The electronic switch and the electronic trigger jointly operating to provide a pulsed charging current to the battery during the A.C. power cycle which is long enough to produce a significant battery-charging effect but short enough to avoid harmful internal heating of the battery. The electronic trigger advantageously includes an R—C element driving a Diac.

9 Claims, 1 Drawing Sheet

U.S. Patent
Sep. 27, 1988
4,774,449
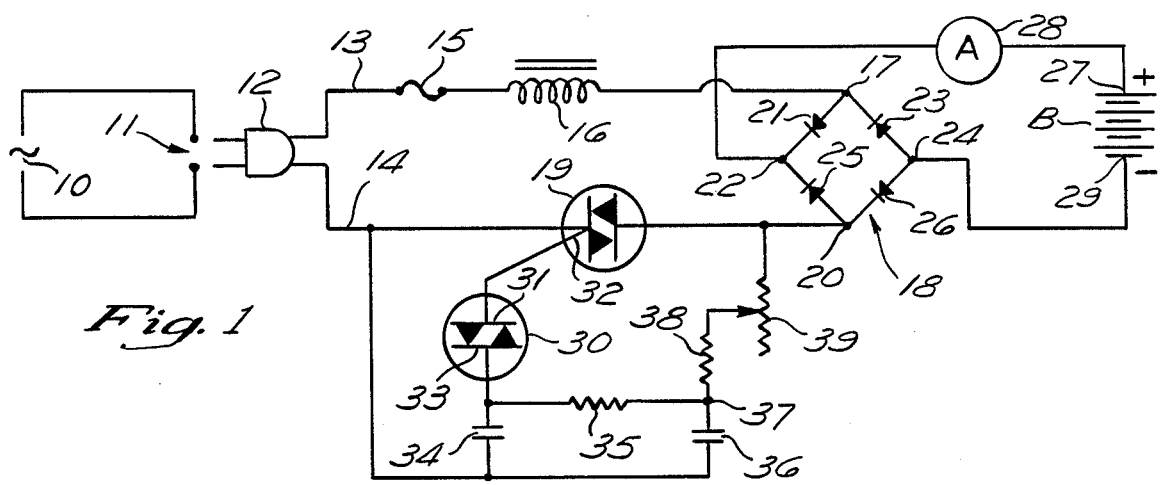
Fig. 1
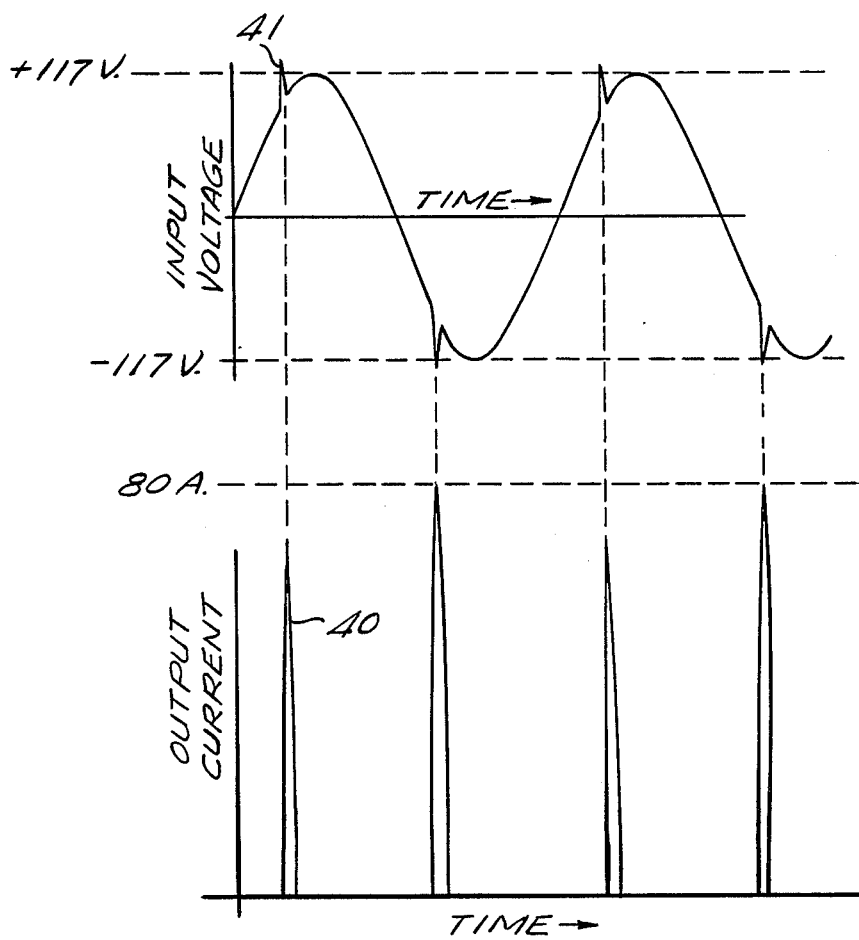
Fig. 2
Fig. 3
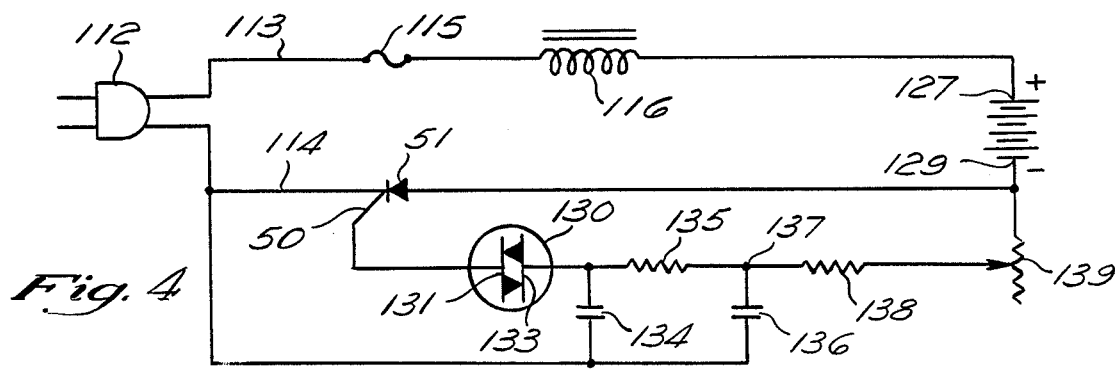
Fig. 4

4,774,449

TRANSFORMERLESS BATTERY CHARGER IN COMBINATION WITH A BATTERY, AND METHOD OF CHARGING A BATTERY

SUMMARY OF THE INVENTION

This invention relates to a novel combination of a battery and a transformerless battery charger and to a novel method of charging a battery.

In both its apparatus and method aspects, the present invention is based on my discovery that a battery can be safely and effectively charged from a conventional 60 Hz., 110–120 volt power outlet without the need for a step-down transformer. In accordance with my invention, an inductor and a semiconductor switching device are connected in series with the battery across the A.C. power input lines. The semiconductor switching device is maintained non-conductive for much of the A.C. power cycle, thereby open-circuiting the charging circuit for the battery, and during the A.C. power cycle it is caused to become conductive as a function of the A.C. voltage and the actual battery voltage at that instant. When the semiconductor switching device turns on, charging current is delivered to the battery. The duration of this current is kept short enough to avoid heating the battery deleteriously but long enough to produce an adequate charging effect on the battery.

A principal object of this invention is to provide a novel combination of a battery and a transformerless battery charger.

Another principal object of this invention is to provide a novel method of charging a battery.

Further objects and advantages of this invention will be apparent from the following detailed description of two presently preferred embodiments which are illustrated schematically in the accompanying drawing.

DESCRIPTION OF THE DRAWING

FIG. 1 is a schematic electrical circuit diagram of a battery charger and battery in accordance with a first embodiment of the present invention;

FIG. 2 shows the A.C. power supply voltage appearing across the input terminals of the full wave rectifier bridge in FIG. 1;

FIG. 3 shows the output current from the rectifier bridge produced by this power supply voltage; and FIG. 4 is a schematic electrical circuit diagram showing a second embodiment of this invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Referring to FIG. 1, the present battery charger is energized from a conventional 110–120 volt A.C. power source 10 connected across a conventional socket 11.

The battery charger includes a conventional pronged plug 12 which is insertable into the socket 11 to have the A.C. voltage applied across respective insulated, current conducting input lines 13 and 14 connected electrically to corresponding terminals of the plug. A conventional current-limiting fuse 15 and a toroidal inductor and 16 are connected in series in line 13 between the corresponding terminal of plug 12 and the upper input terminal 17 of a full-wave rectifier bridge 18 of conventional design. A "Triac" silicon semiconductor device 19 of known design is connected in line 14 ahead of the opposite input terminal 20 of rectifier bridge 18.

The rectifier bridge has a first rectifier 21 with its anode connected to input terminal 17 and its cathode connected to a first output terminal 22. A second rectifier 23 in the bridge 18 has its cathode connected to input terminal 17 and its anode connected to the opposite output terminal 24 of the bridge. A third rectifier 25 in the bridge has its anode connected to input terminal 20 and its cathode connected to output terminal 22. A fourth rectifier 26 in the bridge has its cathode connected to input terminal 20 and its anode connected to output terminal 24.

The battery B which is to be charged has its positive terminal 27 connected to the first output terminal 22 of rectifier bridge 18 through an ammeter 28 of conventional design. The negative terminal 29 of the battery is connected directly to the second output terminal 24 of the rectifier bridge.

The "Triac" 19 acts as a bidirectional switch under the control of a timing circuit including a "Diac" semiconductor device 30 of known design that functions as a bi-directional trigger to turn on the "Triac" 19 briefly once each half cycle of the A.C. voltage across the input terminals 17 and 20 of the full wave rectifier bridge 18. As shown in FIG. 1, the upper terminal 31 of "Diac" 30 is connected directly to the control electrode 32 of "Triac" 19. The lower terminal 33 of the "Diac" is connected to the input line 14 through a first capacitor 34 and through a first resistor 35 and a second capacitor 36 connected in series with each other across capacitor 34. The junction point 37 between resistor 35 and capacitor 36 is connected through a fixed resistor 38 and an adjustable resistor 39 to the lower input terminal 20 of rectifier bridge 18. Capacitor 34, resistor 35, capacitor 36 and resistor 38 together provide a dual R-C time constant network acting as a phase shifter to control the firing of "Diac" 30.

FIG. 2 shows the essentially sinusoidal input voltage appearing across the input terminals 17 and 20 of rectifier bridge 18. During each positive half cycle, shortly before the input voltage reaches its positive sinusoidal peak of 117 volts the "Triac" 19 is turned on to conduct positive current from right to left in FIG. 1. This happens when the "Diac" 30 applies a triggering signal to the control electrode 32 of "Triac" 19. This completes a path for positive polarity current as follows: from line 13 through fuse 15 and inductor 16, rectifier 21 in the rectifier bridge 18, ammeter 28 and through the battery B and rectifier 26 in the rectifier bridge, and through the "Triac" 19 from right to left in FIG. 1 to the other A.C. input line 14. The positive current pulse through the battery is shown at 40 in FIG. 3. It is of short enough duration not to cause harmful internal heating in the battery being charged but long enough to produce a significant charging effect. The practical upper limit of the pulse duration, as a percentage of the half cycle interval of the A.C. input voltage, is about 60% and the practical lower limit is about 0.01%. That is, for the usual 60 Hz. A.C. input voltage, the current pulse 40 may be as long as about 5 milliseconds or as short as about 1 microsecond. Within these limits, the present battery charger produces an adequate charging effect on the battery without overheating it to the extent that the battery would be damaged.

The triggering pulse from the "Diac" 30 which turns on the "Triac" 19 does not last as long as the current pulse 40 delivered to the battery B because, once turned on by the triggering pulse from the "Diac", the "Triac" remains in a current-conducting state until the current pulse 40 drops to virtually zero.

When the "Triac" 19 is conducting current, the toroidal inductor 16 is virtually the only impedance across the A.C. input lines 13 and 14 because the battery B, the ammeter 28, and the current path through the rectifier bridge 18 each provide virtually no impedance.

In one practical embodiment, the output current pulse during each negative half cycle of the power supply voltage is 80 amperes and during each positive half cycle of the power supply voltage it is slightly less than 80 amperes. For a battery having a nominal voltage of 12 volts, the current pulse increases the voltage across the battery by about 8 volts.

The point in the positive half wave of the A.C. input voltage at which the "Triac" 19 begins to conduct depends upon the difference between the instantaneous A.C. input voltage across input lines 13 and 14 and the actual battery voltage at that moment, as well as on the values of inductor 16, capacitors 34 and 36, and resistors 35, 38 and 39. In one practical embodiment, capacitor 34 is 0.1 microfarad, capacitor 36 is 0.1 microfarad, resistor 35 is 15,000 ohms, resistor 38 is 2,200 ohms, and resistor 39 has a maximum value of 100,000 ohms.

During each negative half cycle of the A.C. input voltage across lines 13 and 14, when the "Diac" 30 fires and triggers the "Triac" 19 on, the positive current path through the circuit is from input line 14 through "Triac" 19 from left-to-right in FIG. 1, through rectifier 25 in rectifier bridge 18 and ammeter 28 to the positive battery terminal 27 through the battery B and from the negative battery terminal 29, through rectifier 23 in rectifier bridge 18 and inductor 16 to the opposite A.C. input line 13.

As shown in FIG. 2, each current pulse through the "Triac" 19 produces a corresponding voltage transient 41 in the A.C. input voltage across the rectifier bridge's input terminals 17 and 20.

This battery charger is not limited to use with 12 volt batteries. It may be used to charge any battery with a rated voltage from about 1.5 volts to about 75 volts. Of course, the lower the rated battery voltage, the shorter should be the percentage of time that the "Triac" 19 is on in order to prevent deleterious heating of the battery being charged. The time interval during which the charging current is on (i.e., the charging circuit for the battery is closed) during each half cycle of the A.C. power supply is deterined by the setting of the adjustable tap on resistor 39. The higher the nominal battery voltage, the smaller should be the resistance provided by resistor 39 so that the charging current will be on a higher percentage of the time.

FIG. 4 shows a second embodiment of the present invention which omits the rectifier bridge 18, the ammeter 28 and the "Triac" 19 of FIG. 1. Elements in FIG. 4 which correspond to those in FIG. 1 are given the same reference numerals plus 100, and the detailed description of these elements will not be repeated.

The terminal 131 of "Diac" 130 is connected to the control electrode 50 of a silicon controlled rectifier 51 of known design. The cathode of SCR 51 is connected to the A.C. input line 114. The anode of SCR 51 is connected to the negative terminal 129 of the battery being charged.

The SCR 51 functions as a half wave rectifier under the control of "Diac" 130, such that SCR 51 is turned on only during a positive half cycle (and not in a negative half cycle) of the A.C. input voltage across lines 113 and 114. As with the "Triac" 19 in FIG. 1, once it has been triggered on by the "Diac" 130 the SCR 51 will remain conductive until the current spike or pulse drops to virtually zero.

I claim:

1. In combination with a battery, a transformerless battery charger comprising circuit means for connecting said battery to an A.C. power source to supply charging current to the battery, said circuit means comprising:

inductor means in series with said A.C. power source;
   electronic switch means in series with said A.C. power source, said electronic switch means being normally non-conductive, to thereby open the charging circuit for the battery;
   and electronic trigger means for turning on said electronic switch means to close the charging circuit for the battery as a function of the difference between the instantaneous voltage from said A.C. power source and the battery voltage;
   said electronic switch means and said electronic trigger means being jointly operable to provide a charging current to the battery during the A.C. power cycle long enough to produce a significant battery-charging effect but short enough to avoid harmful internal heating of the battery;
   said electronic switch means being a Triac having a control electrode connected to said electronic trigger means;
   said circuit means also including a full-wave rectifier bridge having a pair of opposite input terminals, one of which is connected to said Triac and the other to said A.C. power source, and a pair of opposite output terminals connected across the battery being charged.

2. The combination of claim 1 wherein:
   said electronic trigger means comprises a Diac and a resistance-capacitance timing network connected to said control electrode of said Triac.

3. The combination of claim 2 wherein said A.C. power source is a 60 Hz., 110–120 volt power supply; and said resistance-capacitance timing network includes resistance means adjustable to provide non-destructive charging of batteries with different nominal voltages.

4. The combination of claim 3 wherein said inductor means is a toroidal inductor.

5. In combination with a battery, a transformerless battery charger comprising circuit means for connecting said battery to an A.C. power source to supply charging current to the battery, said circuit means comprising:

inductor means in series with said A.C. power source;
   electronic switch means in series with said A.C. power source, said electronic switch means being normally non-conductive to thereby open the charging circuit for the battery;
   and electronic trigger means for turning on said electronic switch means to close the charging circuit for the battery as a function of the difference between the instantaneous voltage from said A.C. power source and the battery voltage;

said electronic switch means and said electronic trigger means being jointly operable to provide a charging current to the battery during the A.C. power cycle long enough to produce a significant battery-charging effect but short enough to avoid harmful internal heating of the battery;

said electronic switch means being an SCR having a control electrode connected to said electronic trigger means.

6. The combination of claim 5 wherein:

said electronic trigger means comprises a Diac and a resistance-capacitance timing network connected to said control electrode of said SCR.

7. The combination of claim 6 wherein:

said A.C. power source is a 60 Hz., 110–120 volt power supply; and said resistance-capacitance timing network includes resistance means adjustable to provide non-destructive charging of batteries with different nominal voltages.

8. The combination of claim 7 wherein said inductor means is a toroidal inductor.

9. The combination of claim 5 wherein said electronic switch means is an SCR connected directly between one terminal of said battery and said A.C. power source, said SCR having a control electrode.

* * * * *